Figure 1:
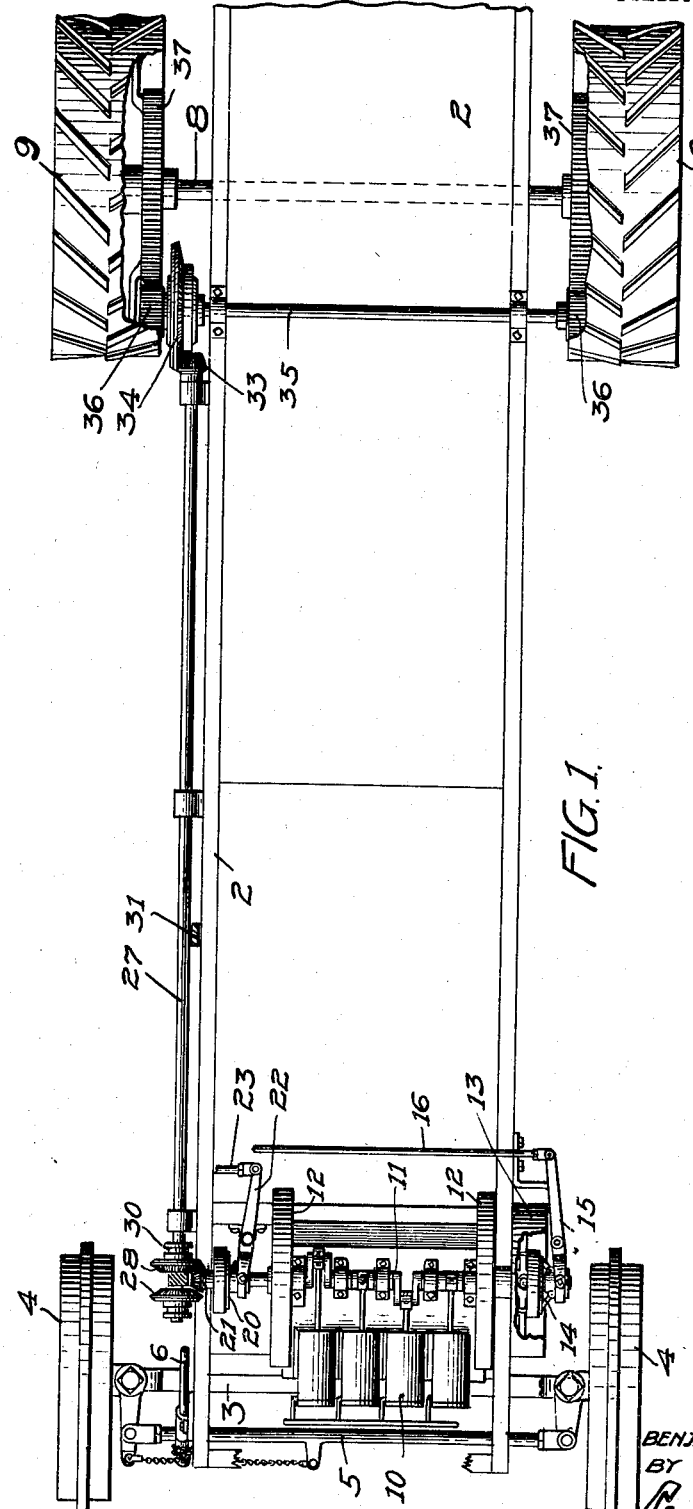

No. 847,736. PATENTED MAR. 19, 1907.
B. DAHL.
TRACTION AND POWER ATTACHMENT FOR THRESHING MACHINES.
APPLICATION FILED DEC. 1, 1905.

2 SHEETS—SHEET 1.

WITNESSES
INVENTOR
BENJAMIN DAHL
BY
HIS ATTORNEYS

No. 847,736. PATENTED MAR. 19, 1907.
B. DAHL.
TRACTION AND POWER ATTACHMENT FOR THRESHING MACHINES.
APPLICATION FILED DEC. 1, 1905.
2 SHEETS—SHEET 2.
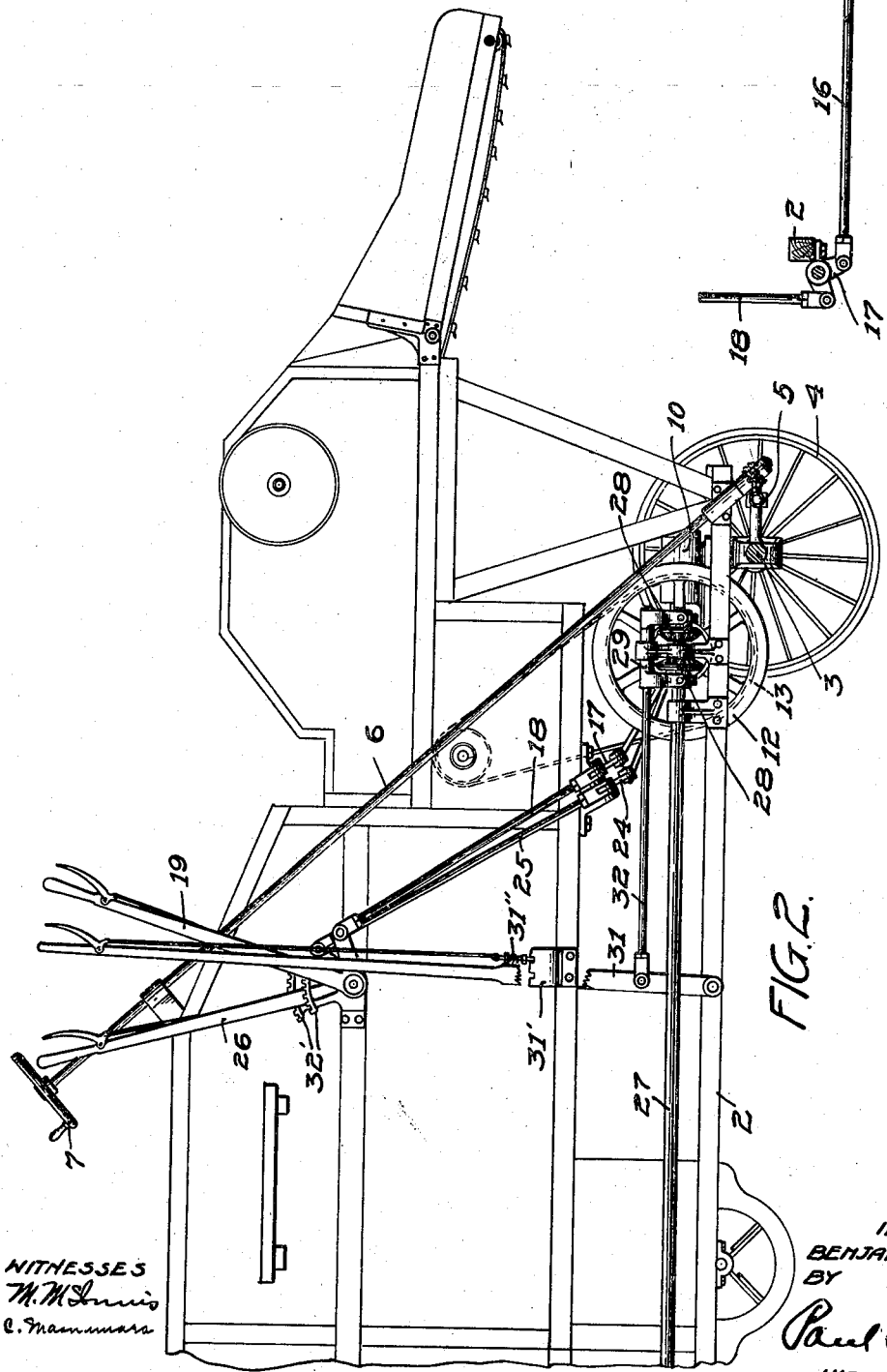
WITNESSES
INVENTOR
BENJAMIN DAHL
BY
Paul & Paul
HIS ATTORNEYS

UNITED STATES PATENT OFFICE.

BENJAMIN DAHL, OF BLOOMER, WISCONSIN.

TRACTION AND POWER ATTACHMENT FOR THRESHING-MACHINES.

No. 847,736.           Specification of Letters Patent.          Patented March 19, 1907.

Application filed December 1, 1905. Serial No. 289,838.

*To all whom it may concern:*

Be it known that I, BENJAMIN DAHL, of Bloomer, Chippewa county, Wisconsin, have invented certain new and useful Improvements in a Traction and Power Attachment for Threshing-Machines, of which the following is a specification.

My invention relates to agricultural machinery; and the object of the invention is to provide a source of power mounted on the threshing-machine and having operative connections with the cylinder and other working parts of the machine and also with the carrying or traction wheels.

The invention consists generally in various constructions and combinations, all as hereinafter described, and particularly pointed out in the claim.

In the accompanying drawings, forming part of this specification, Figure 1 is a plan view illustrating the application of the source of power or. driving means to the traction-wheels. Fig. 2 is a side elevation of one end of the machine. Fig. 3 is a sectional view on the line $y\ y$ of Fig. 2.

In the drawing, 2 represents a suitable frame having a forward axle 3 and wheels 4, provided with a steering mechanism 5, operated through a rod 6 and hand-wheel 7 and corresponding substantially to the steering apparatus of an automobile, and a rear axle 8, having traction-wheels 9. An engine 10, preferably of the gasolene four-cylinder type, is mounted on the forward end of the frame and is connected with a multiple-crank shaft 11, having fly-wheels 12. A loose pulley 13 is provided on one end of said shaft and adapted to be locked on the shaft by a clutch 14. A lever 15 is pivoted on the frame of the machine and connected with said clutch at one end, and a rod 16 is attached to the other end of said lever and extends across the machine-frame and is attached to one arm of a bell-crank 17, the other arm of which being connected to a rod 18, which extends to an operating-lever 19. When this lever is moved back and forth, the bell-crank 17 will be rocked and the lever 15 operated to lock the pulley 13 on the crank-shaft or release the same. A belt (indicated by dotted lines in Fig. 2) connects the pulley 13 with the threshing-cylinder, and from which the other threshing mechanism may be driven in the usual way, it not being necessary to illustrate the belt connections in this case.

On the other end of the crank-shaft 11 from the pulley 13 is a clutch 20, one member thereof carrying a pinion 21 and being loose on the crank-shaft. The other member of the clutch is splined on the shaft in the usual way and moved back and forth toward or from the loosely-mounted member by means of the lever 22, connected by a rod 23 with one arm of the bell-crank 24, which in turn is connected by a rod 25 with an operating-lever 26. A driving-shaft 27 is mounted on the machine-frame at right angles substantially to the crank-shaft, and beveled gears 28 are splined on said shaft on each side of the pinion 21. A yoke 29 has forked ends upon each side of said gears to fit into grooves 30 in the hubs thereof and allow them to be moved back and forth on the drive-shaft.

An operating-lever 31 is pivoted at its lower end on the machine-frame and connected by a rod 32 with the yoke 29. A plate 31' is preferably mounted on the machine-frame, having notches to receive a locking-latch 31'' on said locking-lever and by means of which the gears can be locked in position to drive the machine forward or backward, as preferred. Suitable quadrants 32' are provided for the other levers to receive the locking-latches in the usual way. By means of these levers, heretofore described, the operator can move the gears 28 forward or back to operate the machine in either direction and whenever desired can lock the pulley 13 on the crank-shaft to drive the threshing mechanism. The rear end of the driving-shaft 27 is provided with a pinion 33, arranged to engage the teeth of a compensating gear 34, mounted on one end of a cross-shaft 35 on the machine-frame. This shaft is provided on each end with pinions 36, which engage gears 37, secured to the traction-wheels 9. The compensating gear allows for the difference in travel of the rear wheels in making a turn, and the application of power to both wheels will insure the propulsion of the machine in the desired direction.

I do not wish in this application to be confined to the location of the engine or source of power on the machine-frame, as it may be placed at the rear instead of the forward end, if preferred. In various ways the details of construction may be modified without departing from my invention.

This invention is applicable to other lines of agricultural machinery, such as cornshellers and clover-hullers, as well as to threshing-machines.

I claim as my invention—

The combination, with a threshing-machine frame having forward and rear axles and traction-wheels, of a driving-shaft having sliding gears at its forward end and a fixed pinion at its rear end, a transverse shaft mounted in said frame, near the rear wheels and having pinions meshing with gears mounted on the rear axle, a compensating gear mounted on said transverse shaft and engaging the fixed pinion on said driving-shaft, an engine mounted on said frame and having a crank-shaft and fly-wheels, a loose pulley mounted on one end of said crank-shaft and belted to the threshing-cylinder, a locking-clutch for said loose pulley, a second clutch mounted on said crank-shaft and having a pinion adapted to engage one or the other of said sliding gears according to their position on said driving-shaft, levers having operative connections with said clutches, a lever having operative connections with said sliding gears to move the same back and forth on said driving-shaft, and a steering-post having operative connections with the forward wheels, substantially as described.

In witness whereof I have hereunto set my hand this 22d day of November, 1905.

BENJAMIN DAHL.

Witnesses:
RICHARD PAUL,
C. MACNAMARA.